United States Patent [19]

Takahashi et al.

[11] 4,350,414
[45] Sep. 21, 1982

[54] ALL SOLID STATE ELECTROCHROMIC DEVICE

[75] Inventors: Yosuke Takahashi, Sagamihara; Hideki Akasaka, Kawasaki; Toshikatsu Kasui, Tokyo; Tatsuo Niwa, Kawasaki, all of Japan

[73] Assignee: Nippon Kogaku K. K., Tokyo, Japan

[21] Appl. No.: 160,533

[22] Filed: Jun. 18, 1980

[30] Foreign Application Priority Data

Jun. 26, 1979 [JP] Japan .................................. 54-79626

[51] Int. Cl.³ ............................................... G02F 1/17
[52] U.S. Cl. ..................................... 350/357; 252/408
[58] Field of Search ......................... 350/357; 252/408

[56] References Cited

U.S. PATENT DOCUMENTS

| 4,013,343 | 3/1977 | Jaccard et al. | 350/357 |
| 4,053,209 | 10/1977 | Hara et al. | 350/357 |
| 4,135,790 | 1/1979 | Takahashi et al. | 350/357 |
| 4,191,453 | 3/1980 | Beni et al. | 350/357 |
| 4,201,454 | 5/1980 | Beni et al. | 350/357 |
| 4,258,984 | 3/1981 | Beni et al. | 350/357 |
| 4,294,520 | 10/1981 | Inoue et al. | 350/357 |

FOREIGN PATENT DOCUMENTS

| 52-7753 | 1/1977 | Japan | 350/357 |
| 52-73749 | 6/1977 | Japan | 350/357 |
| 54-7957 | 1/1979 | Japan | 350/357 |
| 54-121758 | 9/1979 | Japan | 350/357 |
| 55-36860 | 3/1980 | Japan | 350/37 |
| 55-133020 | 10/1980 | Japan | 350/357 |
| 55-133083 | 10/1980 | Japan | 350/357 |

OTHER PUBLICATIONS

Dautremont-Smith W. C., et al., Appl. Phys. Lett., vol. 35, No. 7, pp. 565–567 (10/79).
Shay J. L., et al., IEEE Trans. Elect. Devices, vol. ED-26, No. 8, pp. 1138–1142 (Aug. 1979).
Gottesfeld S., et al., Appl. Phys. Lett., vol. 33, No. 2, pp. 208–210 (1978).

Primary Examiner—Teddy S. Gron
Attorney, Agent, or Firm—Shapiro and Shapiro

[57] ABSTRACT

The all solid-state ECD of the present invention features a structure composed of an oxidizable film capable of a redox reaction and showing a change in the transmittance in a certain wavelength range in the oxidized state, a reducible film capable of a redox reaction and showing a change in the transmittance in a certain wavelength range in the reduced state, an insulating film provided between said films and allowing proton conduction but prohibiting electron conduction, and a pair of electrodes between which said three films are maintained, wherein said oxidizable film is substantially composed of iridium hydroxide and/or nickel hydroxide, while said reducible film is substantially composed of tungsten oxide and/or molybdenum oxide.

The ECD shows several faster response speeds, a significantly reduced voltage and the change in the transmittance improved more than six times with a drive voltage reduced to ⅓.

5 Claims, 2 Drawing Figures

ALL SOLID STATE ELECTROCHROMIC DEVICE

BACKGROUND OF THE INVENTION

1. Field of the Invention

The present invention relates to an electrochromic device (hereinafter abbreviated as ECD).

2. Description of the Prior Art

ECD, because of the memory and coloring properties thereof, has been developed for various applications such as a display element, light transmission control element or memory element. Particularly ECD of the all solid-state type, or thin-film type is considered promising for practical use because of the wide variety of applications.

In general, as shown by the characteristic curve in FIG. 1, the ECD shows a decrease in the optical transmittance or transmittivity in response to the application of a voltage, and again increase in the optical transmittance to the original value upon application of an inverse voltage. The performance of the ECD is evaluated by various factors such as the optical density OD to be determined from the transmittance $T_o$ before the coloration and T after the coloration (OD=log $T_o/T$), the magnitude of the voltage required, the coloration time $t_c$ required to reach a transmittance of ½, i.e. OD=0.301 after the application of the voltage, and the bleaching time $t_b$ required to undergo 90% of the change to the original state after the application of the inverse voltage at the minimum transmittance state. Thus a higher OD indicates a higher contrast, a smaller applied voltage means an easier matching with the drive circuit for the ECD, and smaller $t_c$ and $t_b$ indicate faster response of the device.

For such an all solid-state ECD with improved storage property of the coloration display, the Japanese Patent Laid-open No. 73749/1977 proposed a structure with an electro-reducible film of electrochromic material such as molybdenum oxide, tungsten oxide or niobium oxide and an electro-oxidizable film such as of chromium oxide or vanadium oxide mutually separated by an insulating film such as of titanium oxide or tantalum oxide and sandwiched between a pair of opposed electrodes. Such an ECD, under an applied voltage of 1 to 3 V, requires for undergoing a change from an initial transmittance $T_o$ of 100% to a transmittance T of 10%, i.e. for reaching an optical density OD of 1, some seconds. It is also explained in the above-mentioned patent that the bleaching required by the application of an inverse voltage takes more than 1 second and that a change in the transmittance in the range of several to ten percent occurs with the application of a square-wave pulse of ±10 V with a repeating period of 100 msec. Although such all solid-state ECD is superior to those previously reported, the response speed requiring approximately 1 second for the coloration and bleaching cannot be considered as acceptable for use for example in the display element or in the light control element such as the shutter or lens diaphragm in a photographic camera. In addition the change in the transmittance in the range of several to ten percent in repeated drive mode is insufficient, and it is further desirable to reduce the drive voltage, particularly the drive voltage in the repeated drive mode.

SUMMARY OF THE INVENTION

The object of the present invention is to eliminate the above disadvantages and to provide an electrochromic device significantly improved to the practical range from the aforementioned prior technology with respect to the response speed, the drive voltage for the repeated drive mode and the range of transmittance change in such drive mode, etc.

The all solid-state ECD of the present invention features a structure composed of an oxidizable film capable of a redox reaction and showing a change in the transmittance in a certain wavelength range in the oxidized state, a reducible film capable of a redox reaction and showing a change in the transmittance in a certain wavelength range in the reduced state, an insulating film provided between said films and allowing proton conduction but prohibiting electron conduction, and a pair of electrodes between which said three films are maintained, wherein said oxidizable film is substantially composed of iridium hydroxide and/or nickel hydroxide, while said reducible film is substantially composed of tungsten oxide and/or molybdenum oxide. The word "substantially" means that the oxidizable film or the reducible film may either be composed solely of the above-mentioned materials or may contain certain amount of impurities as long as the effect of said materials is exhibited.

The above-mentioned insulating film may be composed of any material capable of allowing the passage of protons but prohibiting the passage of electrons, such as tantalum oxide, zirconium oxide, niobium oxide, alumina, magnesium fluoride, silicon oxide, titanium oxide, hafnium oxide or yttrium oxide.

Now there will be explained the thickness of various thin films to be employed in the present invention.

The optical thickness of the oxidizable film to be employed in the present invention is preferably within a range of 50 to 10,000 Å, particularly in a range of 50 to 5,000 Å in case of iridium hydroxide.

A thickness smaller than the lower limit of said range leads to a low coloration density with resulting lowered contrast, while a thickness larger than the upper limit of said range results in a colored film because of increased light absorption therein, thus deteriorating the display quality.

Also the optical thickness of the reducible film to be employed in the present invention is preferably within a range of 100 to 25,000 Å, as a thickness smaller than the lower limit of said range will lead to a lowered coloration density with resulting lowered contrast, while a thickness larger than the upper limit of said range will result in an increased scattering in said film.

The optical thickness of the insulating film to be employed in the present invention is preferably within a range of 1,000 to 50,000 Å, since a thickness smaller than the lower limit of said range will result in a deteriorated memory property due to insufficient insulation while a thickness larger than the upper limit tends to cause cracks in said film although the memory property is improved.

DESCRIPTION OF THE PREFERRED EMBODIMENTS

Figure 1:
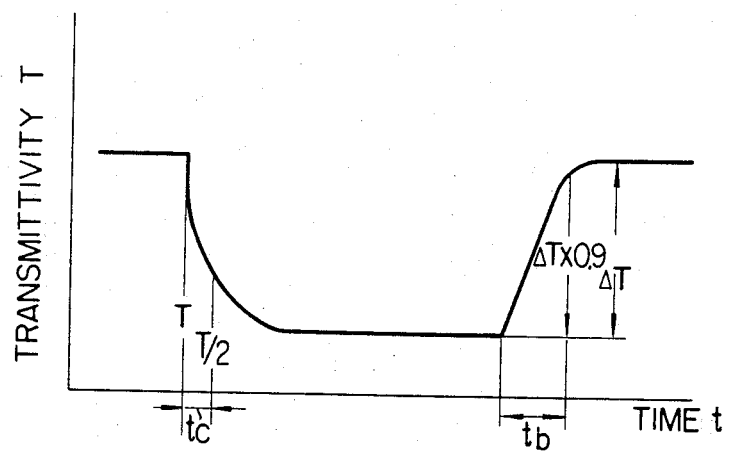
FIG. 1 is a chart showing the general change in the transmittance of ECD.
Figure 2:
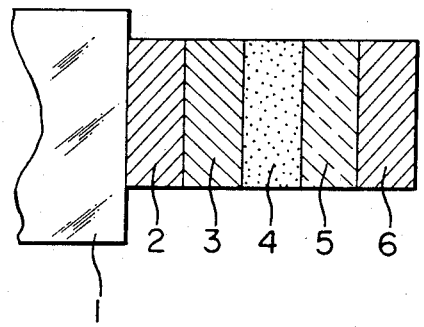
FIG. 2 is a schematic view of the ECD embodying the present invention.

In the following there will be explained an embodiment of the present invention schematically shown in FIG. 2. In said embodiment there is provided a transparent base 1 made for example of glass, on which provided in succession are a transparent electrode 2 composed of indium oxide, an oxidizable film 3 of an optical thickness of 500 Å composed of iridium hydroxide, an insulating film 4 of an optical thickness of 15,000 Å composed of tantalum oxide, a reducible film 5 of an optical thickness of 7,500 Å composed of tungsten oxide, and a transparent electrode made for example of indium oxide.

The performance of the ECD obtained according to the present invention is summarized in Table 1.

TABLE 1

| Voltage | Coloration time $t_c$ | Bleaching time $t_b$ | O.D. |
| --- | --- | --- | --- |
| 0.4 V | — | — | 0.1 |
| 0.6 | — | 50 msec | 0.22 |
| 0.8 | 270 msec | 50 | 0.36 |
| 1.0 | 120 | 50 | 0.52 |
| 1.0 | 100 | 50 | 0.58 |
| 1.2 | 80 | 50 | 0.64 |

Also Table 2 shows the comparison of the performance of the ECD of the present invention and of the conventional ECD disclosed in the aforementiond Japanese Patent Laid-open No. 73749/1977.

TABLE 2

| | ECD of the present invention | Conventional ECD |
| --- | --- | --- |
| Coloration time to reach O.D. = 1 | 0.5 seconds | several seconds |
| Applied voltage required | 0.1–1.5 V | 1–3 V |
| Bleaching time | 0.05 seconds | 1 second or less |
| Change in transmittance in drive mode with square wave of ± 10V, 5 Hz | — | several to ten percent |
| Change in transmittance in drive mode with square wave of ± 1.2V, 5 Hz | 60% or higher | — |

As will be seen from Table 2, the ECD obtainable according to the present invention shows, in comparison with the conventional ECD, much faster response speed, i.e. coloration time and bleaching time with a significantly reduced voltage. Also in the repeated drive mode, the ECD of the present invention shows the change in the transmittance improved more than six times with a drive voltage reduced to ½.

The foregoing data was obtained with the ECD utilizing the oxidizable film composed of iridium hydroxide, the insulating film composed of tantalum oxide and the reducible film composed of tungsten oxide, but similar results are achievable with other materials within the scope of the present invention.

In the present invention, the transparent electrode 2, the iridium hydroxide film 3, the tantalum oxide film 4, the tungsten oxide film 5 and the transparent electrode 6 are prepared according to the known film-forming process such as vacuum evaporation. The thicknesses of these films are not necessarily limited to the values of the foregoing embodiment but the iridium hydroxide layer and the tungsten oxide layer may be made thicker for increasing the coloration density while the tantalum oxide layer may be made thicker for improving the memory property, both within the aforementioned ranges. Also the position of the oxidizable film and the reducible film may be inverted with respect to the base.

As explained in the foregoing, the present invention provides a solid-state electrochromic device of the performance drastically improved in comparison with that of the conventional ECD.

What we claim is:

1. An all solid-state electrochromic device, comprising:
a pair of electrodes;
an oxidizable film provided between said electrodes and capable of a redox reaction;
a reducible film provided between said electrodes and capable of a redox reaction; and
an insulating film provided between the above-mentioned films and allowing passage of protons but prohibiting passage of electrons;
wherein said oxidizable film is substantially composed of iridium hydroxide and/or nickel hydroxide, and said reducible film is substantially composed of tungsten oxide and/or molybdenum oxide.

2. An all solid-state electrochromic device according to the claim 1, wherein said oxidizable film has an optical thickness within a range of 50 to 10,000 Å, said reducible film has an optical thickness within a range of 1,000 to 25,000 Å, and said insulating film has an optical thickness within a range of 1,000 to 50,000 Å.

3. An all solid-state electrochromic device according to the claim 1 or 2, wherein said oxidizable film is substantially composed of iridium hydroxide, said reducible film is substantially composed of tungsten oxide, and said insulating film is substantially composed of tantalum oxide.

4. An all solid-state electrochromic device according to the claim 3, wherein said iridium oxide film has a thickness within a range of 50 to 5,000 Å.

5. An all solid-state electrochromic device according to the claim 1 or 2, wherein said oxidizable film is composed of nickel hydroxide.

* * * * *